(12) United States Patent
Masson et al.

(10) Patent No.: US 9,370,903 B2
(45) Date of Patent: Jun. 21, 2016

(54) PROCESS FOR MANUFACTURING A COMPOSITE, GENERALLY TRIANGULAR, STRUCTURAL PART

(75) Inventors: Richard Masson, Velizy Villacoublay (FR); Gildas Garnier, Velizy Villacoublay (FR)

(73) Assignee: MESSIER-BUGATTI-DOWTY, Velizy-Villacoublay (FR)

(*) Notice: Subject to any disclaimer, the term of this patent is extended or adjusted under 35 U.S.C. 154(b) by 221 days.

(21) Appl. No.: 14/235,267

(22) PCT Filed: Jul. 31, 2012

(86) PCT No.: PCT/EP2012/064977
§ 371 (c)(1),
(2), (4) Date: Jan. 27, 2014

(87) PCT Pub. No.: WO2013/017603
PCT Pub. Date: Feb. 7, 2013

(65) Prior Publication Data
US 2014/0183785 A1    Jul. 3, 2014

(30) Foreign Application Priority Data

Aug. 1, 2011 (FR) .................................. 11 57053

(51) Int. Cl.
| | |
|---|---|
| *B29C 70/48* | (2006.01) |
| *B29B 11/16* | (2006.01) |
| *B29C 70/24* | (2006.01) |
| *B29C 65/62* | (2006.01) |
| *B64C 25/10* | (2006.01) |

(52) U.S. Cl.
CPC .............. *B29C 70/48* (2013.01); *B29B 11/16* (2013.01); *B29C 65/62* (2013.01); *B29C 70/24* (2013.01); *B64C 25/10* (2013.01)

(58) Field of Classification Search
CPC ...... D03D 11/02; D03D 25/005; F16C 7/026; B64C 25/08; B64C 25/10; B64C 25/12; B64C 2025/125; B29B 11/16; B29C 45/14475; B29C 2045/14483; B29C 65/62; B29C 66/1162; B29C 66/12261
See application file for complete search history.

(56) References Cited

U.S. PATENT DOCUMENTS 3,993,308 A * 11/1976 Jenks .................... A63B 49/027
                                                                    264/258
4,114,880 A *  9/1978 Cecka .................. A63B 49/027
                                                                    473/536

(Continued)

FOREIGN PATENT DOCUMENTS

| DE | 10 2009 047 491 A1 | 6/2011 |
|---|---|---|
| EP | 0 056 351 A1 | 7/1982 |
| EP | 0 073 648 A2 | 3/1983 |

*Primary Examiner* — Matthew Daniels
(74) *Attorney, Agent, or Firm* — Sughrue Mion, PLLC

(57) ABSTRACT

A method of fabricating an element (25) out of composite material, the element comprising three arms (22, 23, 24) arranged in a triangle. The method comprises the operations of: fabricating a three-dimensionally woven preform from reinforcing fibers and including through slots defining two arms (22, 23) and two half-arms that are all parallel and contiguous in pairs, each arm (22, 23) having one end whereby it is connected to a half-arm and another end whereby it is connected to the other arm (22, 23); shaping the preform by deploying it and by uniting its two half-arms in order to give it a triangle configuration; securing together the half-arms by stitching with reinforcing fibers; and injecting resin into the preform and polymerizing the resin.

8 Claims, 3 Drawing Sheets

(56) References Cited

U.S. PATENT DOCUMENTS

| | | | | |
|---|---|---|---|---|
| 4,379,798 A * | 4/1983 | Palmer | B29C 70/24 | 428/113 |
| 4,622,254 A * | 11/1986 | Nishimura | B29C 70/228 | 428/102 |
| 4,828,285 A * | 5/1989 | Foret | B29C 65/5042 | 280/279 |
| 5,016,895 A * | 5/1991 | Hollingsworth | B62K 21/02 | 264/258 |
| 5,039,470 A * | 8/1991 | Bezin | B62K 19/16 | 264/255 |
| 5,271,784 A * | 12/1993 | Chen | B29C 70/345 | 156/156 |
| 5,540,877 A * | 7/1996 | Repetto | A63B 49/10 | 156/173 |
| 5,609,349 A * | 3/1997 | Buckmiller | B29C 53/824 | 280/279 |
| 5,665,451 A * | 9/1997 | Dorn | B29C 70/24 | 428/116 |
| 5,692,764 A * | 12/1997 | Klein | B62K 21/02 | 188/DIG. 1 |
| 6,422,958 B1 * | 7/2002 | Repetto | A63B 49/10 | 473/536 |
| 6,431,574 B1 * | 8/2002 | Gueugneaud | B62K 19/16 | 264/512 |
| 2006/0121809 A1 | 6/2006 | Goering | | |
| 2007/0007386 A1 * | 1/2007 | Coupe | B29C 70/24 | 244/102 A |
| 2007/0137778 A1 * | 6/2007 | Dunleavy | B29C 70/222 | 156/256 |
| 2007/0257466 A1 * | 11/2007 | Murphy | B62K 19/16 | 280/276 |
| 2008/0230650 A1 * | 9/2008 | Meyer | B64C 25/14 | 244/100 R |
| 2009/0163100 A1 | 6/2009 | Goering | | |
| 2010/0080952 A1 * | 4/2010 | Suzuki | B29B 11/16 | 428/113 |
| 2011/0308702 A1 * | 12/2011 | Serey | B29C 70/24 | 156/93 |
| 2012/0049411 A1 * | 3/2012 | Masson | B29C 70/24 | 264/299 |
| 2013/0152772 A1 * | 6/2013 | Masson | B29C 70/222 | 87/9 |
| 2014/0147222 A1 * | 5/2014 | Jerome | B23B 41/00 | 408/1 R |
| 2015/0239553 A1 * | 8/2015 | Leclercq | B64C 25/10 | 244/102 R |

* cited by examiner

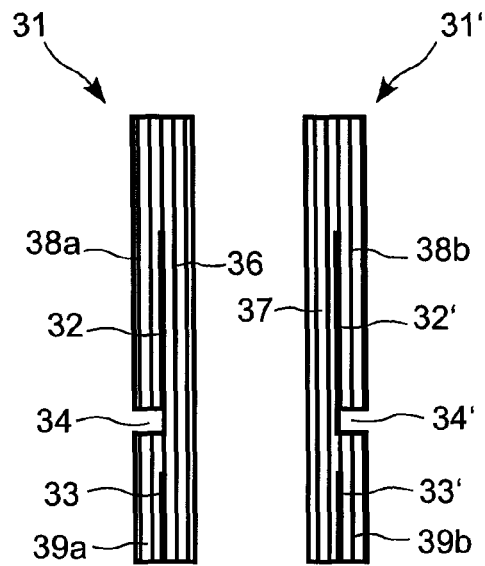
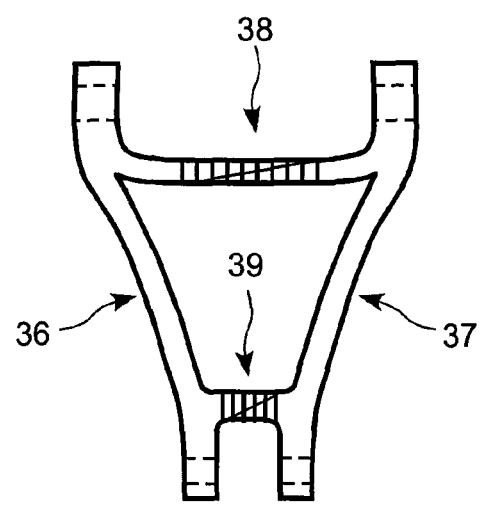
FIG. 8
FIG. 9
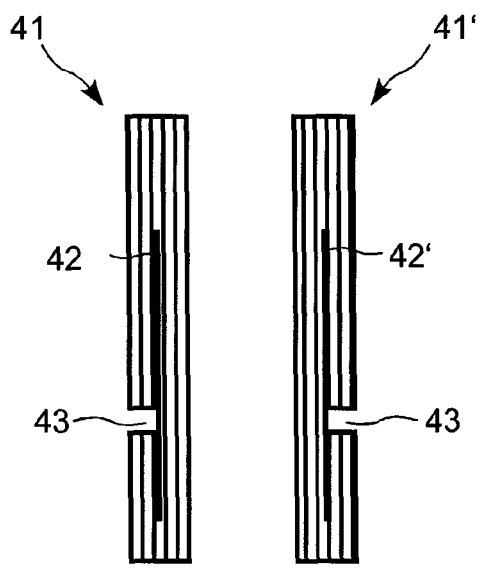
FIG. 10

PROCESS FOR MANUFACTURING A COMPOSITE, GENERALLY TRIANGULAR, STRUCTURAL PART

CROSS REFERENCE TO RELATED APPLICATIONS

This application is a National Stage of International Application No. PCT/EP2012/064977, filed on Jul. 31, 2012, which claims priority from French Patent Application No. 1157053, filed on Aug. 1, 2011, the contents of all of which are incorporated herein by reference in their entirety.

The invention relates to a method of fabricating a generally triangular structural part out of composite material comprising reinforcing fibers such as carbon fibers.

BACKGROUND OF THE INVENTION

The invention relates more particularly to fabricating a structural part of the type comprising three arms arranged in a triangle and connected together at their ends.

By way of example, such a part corresponds to an element of a scissors linkage of an aircraft nose undercarriage, or to a panel for deploying such a nose undercarriage.

One such nose undercarriage deployment panel is shown in FIG. 1 where it is given reference 1, and it comprises three arms given references 2, 3, and 4, that are connected to one another at their ends, and at each of its vertices it also includes a clevis, these clevises given references 6, 7, and 8.

The panel that is shown in FIG. 1 is fabricated using metal materials, involving operations such as shaping, machining, etc.

OBJECT OF THE INVENTION

The object of the invention is to fabricate a generally triangular structural part such as a nose undercarriage scissors linkage element or a deployment panel for such an undercarriage, while using composite material for a competitive cost.

SUMMARY OF THE INVENTION

To this end, the invention provides a method of fabricating a structural element out of composite material, the element comprising three arms arranged in a triangle and connected to one another via their respective ends, the method comprising the operations of:

using a fabric three-dimensionally woven from reinforcing fibers to fabricate a preform having through slots defining two arms and two half-arms that are all parallel and contiguous in pairs, each arm having one end whereby it is connected to a half-arm and another end whereby it is connected to the other arm;

shaping the preform by deploying it and by uniting its two half-arms to give it a triangle configuration with two sides corresponding to the two arms of the preform and with its third side corresponding to uniting the two half-arms of the preform;

securing together the two half-arms by stitching reinforcing fibers through both half-arms; and injecting resin into the preform and polymerizing the resin.

The invention also provides a method of fabricating a structural element out of composite material, the element comprising three arms arranged in a triangle and connected to one another via their respective ends, the method comprising the operations of:

using a fabric three-dimensionally woven from reinforcing fibers to fabricate two half-preforms, each having through slots defining an arm and a half-arm that are parallel and contiguous and that are connected together at one of their ends, and also a half-bridge connected to the arm;

shaping the half-preforms by deploying them and uniting firstly the two half-arms of the two half-preforms and also uniting the two half-bridges of the two half-preforms in order to give the assembly a triangle configuration with two sides corresponding to the two arms connected together by the half-bridges, and with its third side corresponding to uniting the two half-arms;

securing together the two half-arms by stitching reinforcing fibers through both half-arms, and securing the two half-bridges by stitching reinforcing fibers through both half-bridges; and an operation of injecting resin into the united half-preforms and polymerizing the resin.

The invention also provides a method as defined above, wherein each preform or half-preform is made up of layers of transverse and longitudinal fibers that are woven together in such a manner that the fibers in one direction are interlinked with the fibers of a plurality of layers, and wherein each preform or half-preform has one or more through slots each corresponding to two contiguous layers having no fibers interlinking them in a predetermined region, each of these through slots being obtained directly during the weaving of the three-dimensional fabric from which the preform or the half-preform is fabricated.

The invention also provides a method as defined above, wherein each preform or half-preform comprises one or more through slots obtained by cutting or machining a portion of the three-dimensional fabric from which the preform or half-preform is made.

The invention also provides a method as defined above, wherein each preform or half-preform is made from a strip of a three-dimensional fabric, the strip being obtained by cutting the three-dimensional fabric in a plane extending transversely to a main weaving direction of the three-dimensional fabric.

BRIEF DESCRIPTION OF THE FIGURES

FIG. 8 is a diagrammatic view showing two half-preforms for fabricating a triangular part in accordance with the invention;

FIG. 9 is a diagrammatic view of the panel fabricated on the basis of two half-preforms; and FIG. 10 is a diagrammatic view of a variant of half-preforms suitable for use in the method of the invention.

DETAILED DESCRIPTION OF THE INVENTION

The idea on which the invention is based is to provide a preform made of three-dimensionally woven fabric in which the various arms of the panel are defined by different slots, and to deploy the preform so as to constitute the triangular part prior to injecting resin into the preform and polymerizing the resin.

Figure 1:
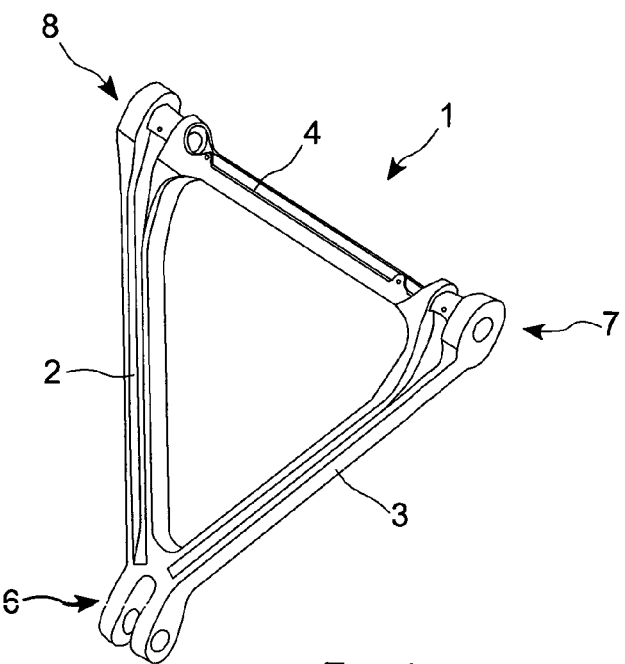
FIG. 1 is an overall view of a prior art triangular panel of metal type for fitting to nose landing gear of an aircraft.
Figure 2:
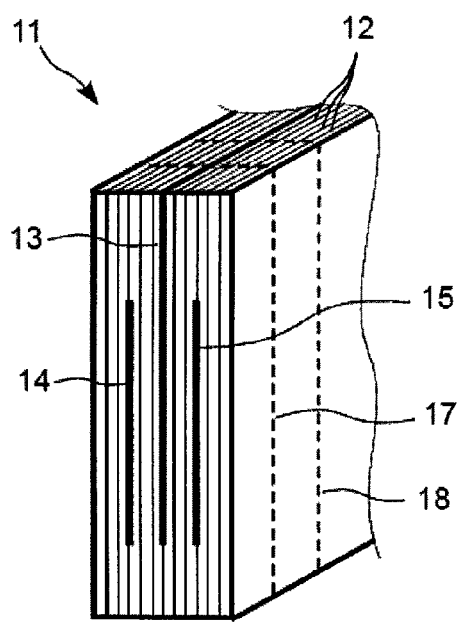
FIG. 2 is a perspective diagram showing a piece of three-dimensional fabric from which a preform is fabricated in the method of the invention.

The three-dimensional fabric piece used for the invention, which is shown in FIG. 2 with a reference 11, is constituted by woven reinforcing fibers such as carbon fibers. It is constituted by a series of plane layers of reinforcing fibers that are superposed and bonded to one another.

More particularly, it comprises layers of transverse and longitudinal fibers that are woven together in such a manner that the fibers in one direction (transverse or longitudinal) are interlaced with fibers in a plurality of other layers, the various layers being referenced 12.

As can be seen in FIG. 2, this piece of fabric presents a section that is defined by an outline that is rectangular or possibly trapezoidal, and it also has three through slots given references 13, 14, and 15, that extend parallel to one another.

Figure 3:
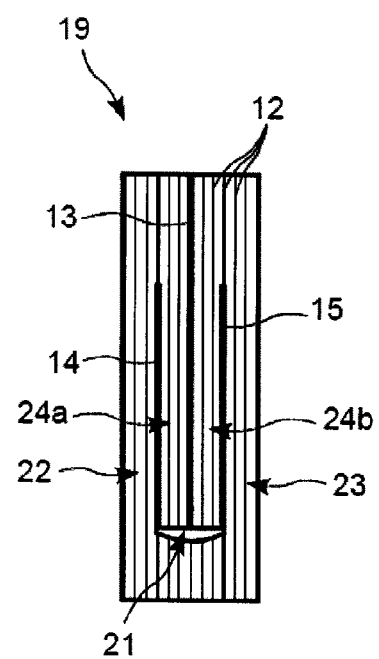
FIG. 3 is a diagrammatic view of a woven preform used in the method of the present invention.

In FIGS. 2 and 3, the section of this piece of fabric is shown vertically, i.e. the long side of the rectangle defining the outline of this section and that corresponds to the width of the piece of fabric, extends vertically. The short side of this outline, which is shown horizontally in the figures, thus corresponds to the thickness of the piece of fabric.

In general, this piece of fabric is made along a length that may be considerable, so as to produce a plurality of different preforms by cutting this piece of fabric at regular intervals along its length. Such cuts are shown in dashed lines in FIG. 2 and they are given references 17 and 18 therein. In other words, each preform corresponds to a strip cut from the long piece of three-dimensional fabric.

Each slot of the piece of fabric 11 is constituted by two contiguous layers of reinforcing fibers that are not interlinked over a portion of the width of the piece of fabric, and over the entire length of the piece of fabric. This arrangement, i.e. the fact that certain pairs of contiguous layers are not interlinked in a predetermined region, is obtained directly during the weaving operation, i.e. while fabricating the piece of fabric.

Once this piece of fabric is ready, it is cut along the line 17, i.e. in a plane extending transversely to the general direction in which the piece was woven, in order to extract a strip for constituting the preform 19 shown in FIG. 3. Initially, the preform has the three through slots 13, 14, and 15 that result from the weaving, and an additional slot is made by cutting using a water jet or by machining, so as to completely outline the various arms of the triangular part to be fabricated.

As can be seen in FIG. 3, the through slot 13 is a central slot that extends from one of the short sides of the rectangular outline of the preform, extending parallel to its long sides over a length that corresponds substantially to four-fifths of the length of those long sides.

The slots 14 and 15 are situated on either side of the central slot 13 and they extend parallel thereto over a length corresponding substantially to two-thirds of the length of the long sides, these two slots 14 and 15 not extending as far as the short sides of the rectangular outline of the preform.

Each of the three slots 13, 14, and 15 has one end close to the short side of the outline that is opposite from the short side from which the central slot 13 starts. These three ends are all situated at the same distance from the short side in question, and they are united by an additional slot, referenced 21, which additional slot is made by cutting or by machining, in a manner that is completely distinct from the weaving operation.

By way of example, this cutting or machining operation to obtain the additional slot 21 may be performed after cutting off the strip of fabric along the line 17 in FIG. 2.

As can be seen in FIG. 3, the preform 19 of outline that is rectangular or even trapezoidal, thus defines three arms constituting the part to be fabricated. The first arm, referenced 22, is defined by the slot 14 and by the closer long edge of the outline. In analogous manner, the second arm, referenced 23, is defined by the slot 15 and by the closer long edge of the outline.

A first half-arm, referenced 24a, is defined by the central slot 13 and by the slot 14, and a second half-arm 24b is defined by the central slot 13 and by the slot 15. As explained below, the half-arms 24a and 24b are designed to be united and secured to each other in order to constitute a single arm 24.

Because of the though slots 13-15 and 21, the arm 22 presents an end, namely the top end in the figures, whereby it is connected to the top end of the half-arm 24a, and another end, namely the bottom end in the figures, whereby it is connected to the bottom end of the arm 23. In analogous manner, the arm 23 is connected to the half-arm 24b via its top end and it is connected to the arm 22 via its bottom end. Each of the half-arms 24a and 24b has a free end that is situated at the cut-out or machined slot 21.

Figure 4:
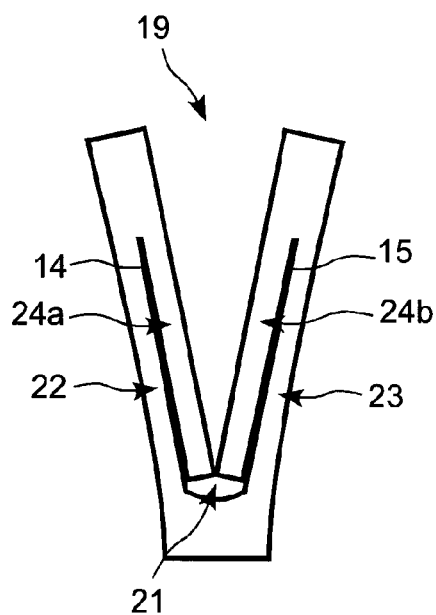
FIG. 4 is a diagrammatic view of the FIG. 3 preform at the beginning of shaping in the method of the invention.
Figure 5:
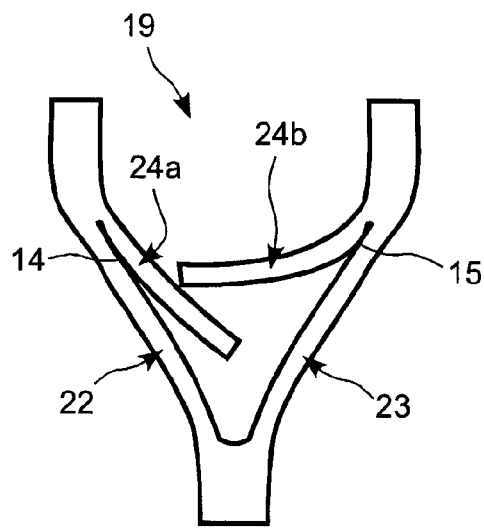
FIG. 5 is a diagrammatic view of the preform of FIGS. 3 and 4 at the end of shaping in the method of the invention.
Figure 6:
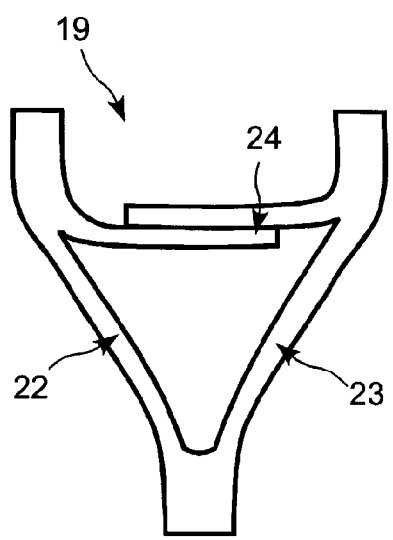
FIG. 6 is a diagrammatic view of the preform of FIGS. 3 to 5 once it has been shaped in order to constitute the triangular panel.

Once the preform is ready, i.e. once it corresponds to the diagram of FIG. 3, it is deployed so as to give it the shape of the triangular structural part that is to be fabricated, with this deployment being performed by shaping tooling (not shown) and corresponding to the steps shown in FIGS. 4 to 6.

Initially, the two main branches of the preform, i.e. the branch comprising the elements 22 and 24a and also the branch comprising the elements 23 and 24b are spaced apart from each other, as shown in FIG. 4, which corresponds to splaying open the slot 13 that opens out into the top small edge of the outline of the preform section.

Thereafter, as shown in FIG. 5, the half-arm 24a is spaced apart from the arm 22, which amounts to splaying open the slot 14, and the half-arm 24b is spaced apart from the arm 23, which amounts to splaying open the slot 15.

Under these conditions, the half-arms 24a and 24b are brought towards each other so as to run along each other and bear against each other, thereby forming a single arm 24, as shown diagrammatically in FIG. 6. The preform then has a triangular shape with the arms 22 and 23 corresponding to two sides of the triangle, while its third side is made up of the arm 24 that corresponds to uniting the half-arms 24a and 24b.

At the stage of FIG. 6, the preform is held in shape by the tooling that was used for shaping it as a triangle. Thereafter, a stitching operation is performed to secure the half-arm 24a to the half-arm 24b, with this being performed by using specialized tooling to stitch reinforcing fibers 26 so that each stitched fiber crosses through both of the half-arms 24a and 24b that run along each other over a fraction of their lengths.

When the two half-arms 24a and 24b have been secured to each other by stitching, the triangularly-shaped preform is separated from the shaping tooling in order to be installed in a mold (not shown) where resin is injected and then polymerized.

Once the preform has been shaped as a triangle and placed in the mold, a heating cycle is started, the resin is injected, and then the resin is polymerized by being heated.

Figure 7:
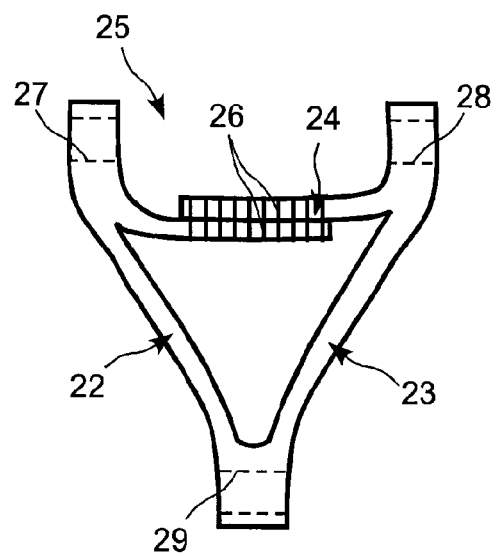
FIG. 7 is a diagrammatic view of a triangular part made in accordance with the method of the invention.

Once the unfinished part is ready, i.e. once the resin has polymerized and the part has been extracted from the mold, various machining operations are performed corresponding substantially to finishing the part, in order to arrive at the part 25 shown in FIG. 7.

Amongst other operations, these machining operations include making holes 27, 28, 29 at each corner of the triangle formed by the part, in order to form lugs via which the part will subsequently be secured to other mechanical components. Additionally, a bearing-forming ring is mounted in each hole or lug as formed in this way.

More precisely, the hole 27 is made in the portion of material whereby the arm 22 is connected to the half-arm 24a, the hole 28 is made in the portion of material whereby the arm 23 is connected to the half-arm 24b, and the hole 29 is made in the portion of material connecting together the arms 22 and 23. As can be seen in the figures, the three portions of material in which the holes are made are situated substantially beyond the vertices of the triangle defined by the three arms 22, 23, and 24. These three holes are oriented parallel to one another, and the holes 27 and 28 are mutually in alignment.

The invention is not limited to the preform configuration shown in FIG. 3, and other configurations could equally well be adopted, providing they can be deployed so as to be arranged in the shape of a three-armed triangular part.

In the examples of FIGS. 8 and 9, the generally triangular part is fabricated from two half-preforms that are complementary, and specifically that are symmetrical to each other.

Like the preform of FIG. 3, these half-preforms are obtained from pieces of three-dimensional fabric that have been woven in such a manner as to form various through slots for defining the arms of the part that is to be formed. Each half-preform is likewise made by cutting a strip from the piece of fabric, prior to making in this strip that already has one or more through slots that result from weaving, an additional transverse notch or slot by cutting or by machining.

In the example of FIG. 8, the half-preform 31 is of generally rectangular outline and it has a central through slot 32 that results from weaving, which slot extends parallel to the long sides of the outline of the half-preform, extending over a length that corresponds substantially to two-thirds of the length of the long sides.

This half-preform 31 has another through slot, referenced 33, that extends in line with the central slot 32 and that is spaced apart therefrom, opening out into a short side of the rectangular outline of the half-preform.

In addition to these slots 32 and 33 that result from the weaving, an additional slot or notch is made by cutting or by machining so that one of the ends of the central slot 32 opens out into one of the long sides of the rectangular outline of the half-preform, this additional through slot or notch being referenced 34.

In analogous manner, the half-preform 31' likewise has a central through slot 32', another slot 33', both obtained directly by the weaving operation, and an additional slot or notch 34' made by cutting or machining after weaving.

In this configuration, the slots 32 and 33 co-operate with one of the long sides of the rectangular outline to define a first arm 36, the slot 32 co-operates with a portion of the opposite long edge to define a first half-arm 38a, and the slot 33 co-operates with another portion of the opposite long edge to define a coupling half-bridge 39a. In analogous manner, the corresponding slots 32' and 33' define the other arm 37, the other half-arm 38b, and the other coupling half-bridge 39b.

As can be seen in FIG. 8, the half-arm 38a is connected via its end to the arm 36, and the half-bridge 39a is connected via its top end to a bottom region of the arm 36 coinciding substantially with the slot 34'. The same applies for the preform 31'.

Once these two half-preforms 31 and 31' have been obtained, they are deployed while facing each other using shaper tools that are not shown. In a manner analogous to that described with reference to FIGS. 4 to 6, this deployment leads to the half-arms 38a and 38b being united so as to form a single arm 38, and likewise to the half-bridges 39a and 39b being united so as to constitute a bridge 39 uniting the bottom ends of the arms 36 and 37, as in the arrangement shown in FIG. 9.

Thereafter, the two half-arms 38a and 38b are secured to each other by stitching, and in analogous manner the half-bridges 39a and 39b are also united by stitching.

The assembly is then placed in an injection mold in order to inject resin therein, and then polymerize the resin. The unfinished part is then extracted in order to proceed with various machining and/or finishing operations.

It is also possible to have half-preforms of other shapes, such as the shapes that are shown in FIG. 10, for example. In this configuration, each half-preform 41, 41' is likewise obtained from a three-dimensional fabric that has been woven to include a central slot 42, 42', and by an operation of machining or cutting that is performed subsequently to make an additional slot or notch 43, 43'. As in the configuration of FIGS. 8 and 9, these shapes can be used to define two arms and also two half-arms and two half-bridges that are for assembling together in order to take up a configuration identical to that of FIG. 9.

As can be seen in particular in the example of FIG. 9, the arms and any half-bridges used for connecting one preform portion to the other or for connecting together two half-preforms, are advantageously designed to be of chamfered shapes so that once united they constitute a portion presenting thickness that is substantially constant.

The invention claimed is:

1. A method of fabricating a structural element (25) out of composite material, the element comprising three arms (22, 23, 24) arranged in a triangle and connected to one another via their respective ends, the method comprising the operations of:
   using a fabric three-dimensionally woven from reinforcing fibers to fabricate a preform (19) having through slots (13, 14, 15, 21) defining two arms (22, 23) and two half-arms (24a, 24b) that are all parallel and contiguous in pairs, each arm (22, 23) having one end whereby it is connected to a half-arm (24a, 24b) and another end whereby it is connected to the other arm (22, 23);
   shaping the preform (19) by deploying it and by uniting its two half-arms (24a, 24b) to give it a triangle configuration with two sides corresponding to the two arms (22, 23) of the preform (19) and with its third side corresponding to uniting the two half-arms (24a, 24b) of the preform;
   securing together the two half-arms (24a, 24b) by stitching reinforcing fibers through both half-arms (24a, 24b); and
   injecting resin into the preform (19) and polymerizing the resin.

2. The method according to claim 1, wherein each preform (19) is made up of layers (12) of transverse and longitudinal fibers that are woven together in such a manner that the fibers in one direction are interlinked with the fibers of a plurality of layers (12), and wherein each preform (19) has one or more through slots (13, 14, 15) each corresponding to two contiguous layers (12) having no fibers interlinking them in a predetermined region, each of these through slots (13, 14, 15) being obtained directly during the weaving of the three-dimensional fabric from which the preform (19) is fabricated.

3. The method according to claim 1, wherein each preform (19) comprises one or more through slots (21) obtained by cutting or machining a portion of the three-dimensional fabric from which the preform (19) is made.

4. The method according to claim 1, wherein each preform (19) is made from a strip of a three-dimensional fabric, the strip being obtained by cutting the three-dimensional fabric in a plane extending transversely to a main weaving direction of the three-dimensional fabric.

5. The method of fabricating a structural element out of composite material, the element comprising three arms (36, 37, 38) arranged in a triangle and connected to one another via their respective ends, the method comprising the operations of:

using a fabric three-dimensionally woven from reinforcing fibers to fabricate two half-preforms (31, 31'; 41, 41'), each having through slots (32, 32', 33, 33'; 42, 42') defining an arm (36, 37) and a half-arm (39a, 39b) that are parallel and contiguous and that are connected together at one of their ends, and also a half-bridge (39a, 39b) connected to the arm (36, 37);

shaping the half-preforms (31, 31'; 41, 41') by deploying them and uniting firstly the two half-arms (38a, 38b) of the two half-preforms (31, 31'; 41, 41') and also uniting the two half-bridges (39a, 39b) of the two half-preforms (31, 31'; 41, 41') in order to give the assembly a triangle configuration with two sides corresponding to the two arms (36, 37) connected together by the half-bridges (39a, 39b), and with its third side corresponding to uniting (38) the two half-arms (38a, 38b);

securing together the two half-arms (38a, 38b) by stitching reinforcing fibers through both half-arms (38a, 38b), and securing the two half-bridges (39a, 39b) by stitching reinforcing fibers through both half-bridges (39a, 39b); and an operation of injecting resin into the united half-preforms (31, 31'; 41, 41') and polymerizing the resin.

6. The method according to claim 5, wherein each half-preform (31, 31'; 41, 41') is made up of layers (12) of transverse and longitudinal fibers that are woven together in such a manner that the fibers in one direction are interlinked with the fibers of a plurality of layers (12), and wherein each half-preform (31, 31'; 41, 41') has one or more through slots (32, 33, 32', 33'; 42, 42') each corresponding to two contiguous layers (12) having no fibers interlinking them in a predetermined region, each of these through slots (32, 33, 32', 33'; 42, 42') being obtained directly during the weaving of the three-dimensional fabric from which the half-preform (31, 31'; 41, 41') is fabricated.

7. The method according to claim 5, wherein each half-preform (31, 31'; 41, 41') comprises one or more through slots (34, 34'; 43, 43') obtained by cutting or machining a portion of the three-dimensional fabric from which the half-preform (31, 31'; 41, 41') is made.

8. The method according to claim 5, wherein each half-preform (31, 31'; 41, 41') is made from a strip of a three-dimensional fabric, the strip being obtained by cutting the three-dimensional fabric in a plane extending transversely to a main weaving direction of the three-dimensional fabric.

* * * * *